UNITED STATES PATENT OFFICE 2,399,066

HETEROCYCLIC STILBENE AZO DYESTUFFS

Max Schmid, Riehen, and Eduard Moser, Basel, Switzerland, assignors to the firm Society of Chemical Industry in Basle, Basel, Switzerland No Drawing. Application March 24, 1943, Serial No. 480,381. In Switzerland March 6, 1942

8 Claims. (Cl. 260—152)

The present invention relates to dyestuffs of the general formula

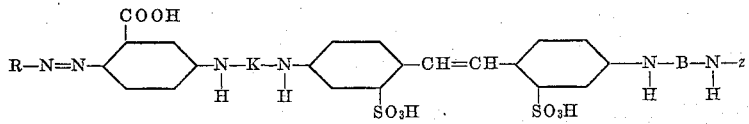

which are valuable products. In this general formula R stands for the radical of a compound having a keto group capable of undergoing enolisation, K stands for a connecting link consisting of the radical of a six-membered heterocyclic compound which contains at least two and not more than three mobile halogen atoms and in which at least two halogen atoms have been exchanged for the

groups, the heterocyclic ring of the heterocyclic compound being composed of three to four carbon atoms and three to two nitrogen atoms, not more than two nitrogen atoms being adjacent to one another, and at least two and not more than three carbon atoms of the hetero-ring being united to mobile halogen atoms, B stands for a connecting link consisting either of the radical of a heterocyclic compound as explained for K or of a C=O group, and

stands for the radical of a yellow aminoazo-dyestuff which contains at least once an atom grouping which enables it to yield complex metal compounds. These new dyestuffs are characterized by a pronounced affinity for cellulose or regenerated cellulose, for example for textile materials consisting of or containing such materials, for instance mixtures of cotton and artificial fibers from regenerated cellulose and regenerated cellulose delustred by inorganic pigments, respectively, or mixtures of wool and such artificial fibers. The new dyestuffs dye these materials greenish yellow to reddish yellow tints. The fastness to light and the wet fastness properties of the dyeings can be essentially improved by after-treatment with metal salts, especially copper salts. This metallization can be effected simultaneously with dyeing. In many cases it may be appropriate to produce the metal compounds of the dyestuffs as such and to use the metalliferous products for example like substantive dyes.

The new dyestuffs can be illustrated by the following characteristic representatives:

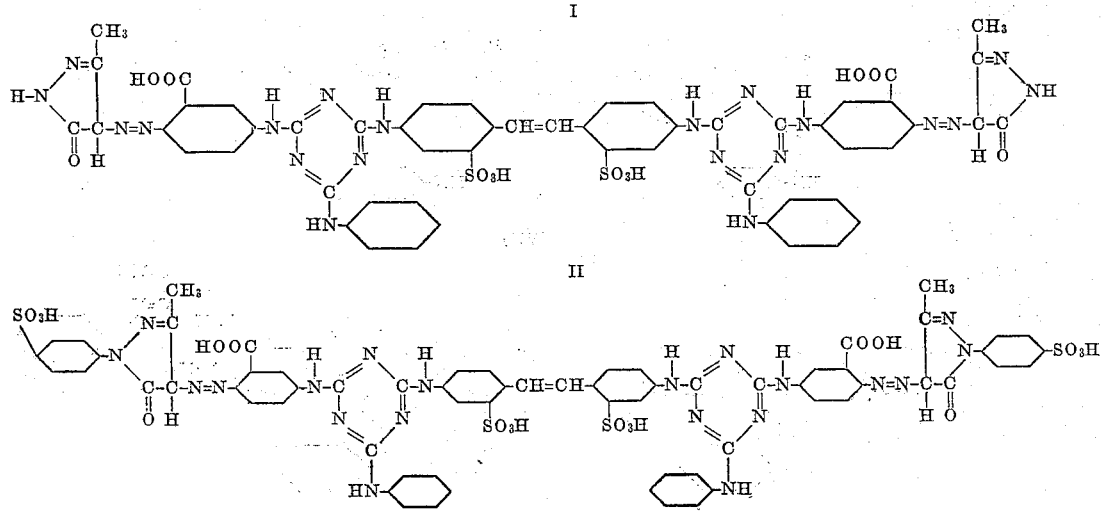

III
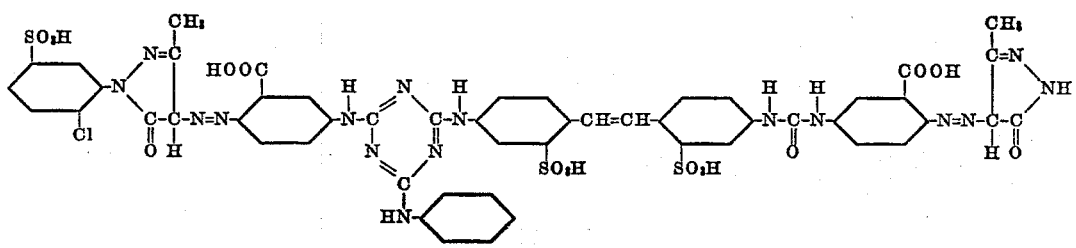
IV
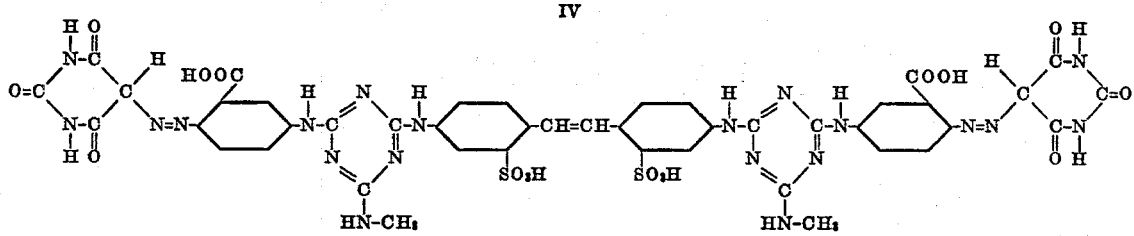
V
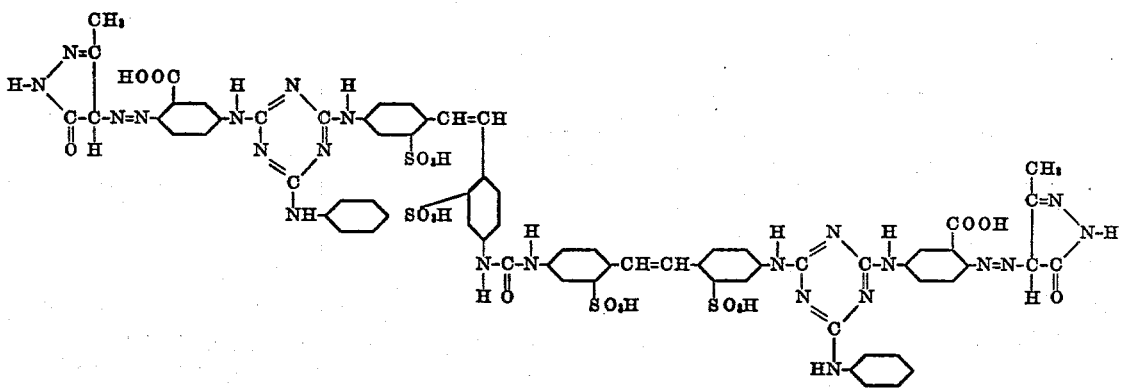
VI
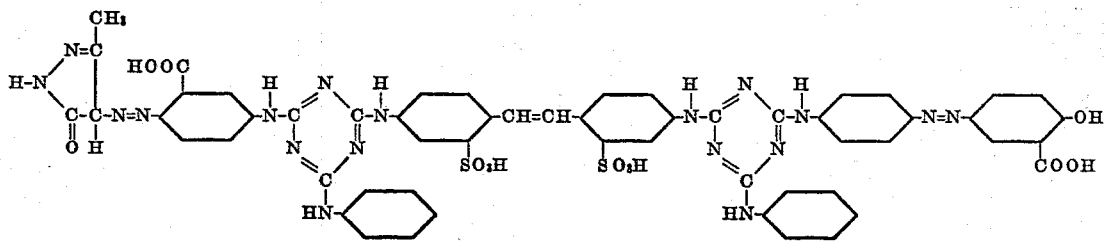
VII
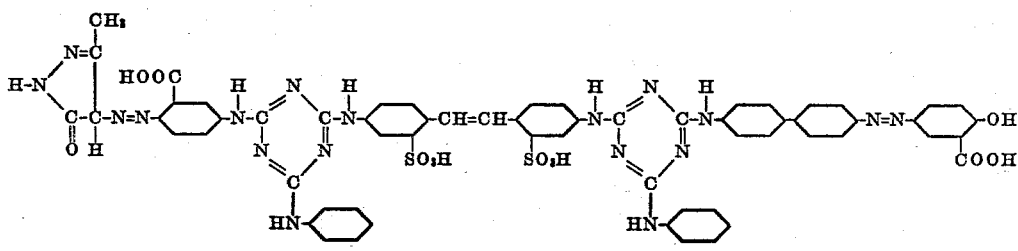
VIII
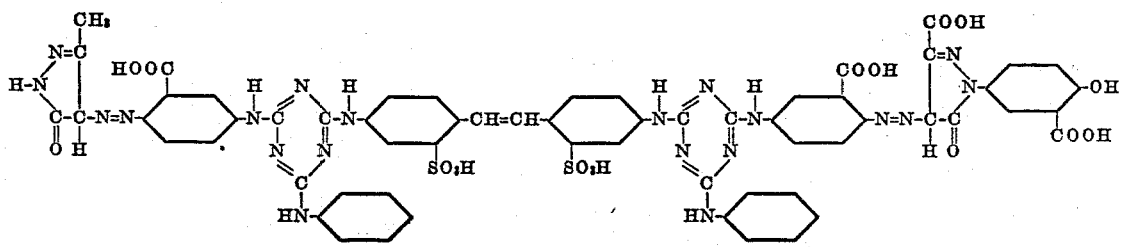

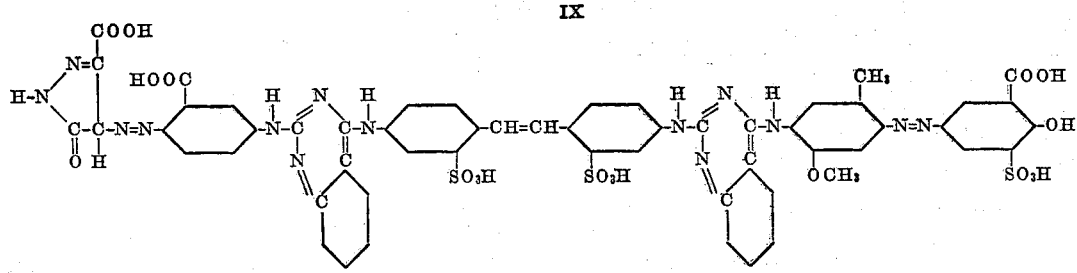
IX
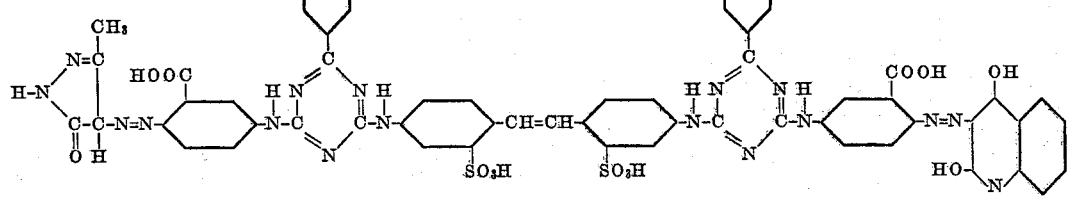
X
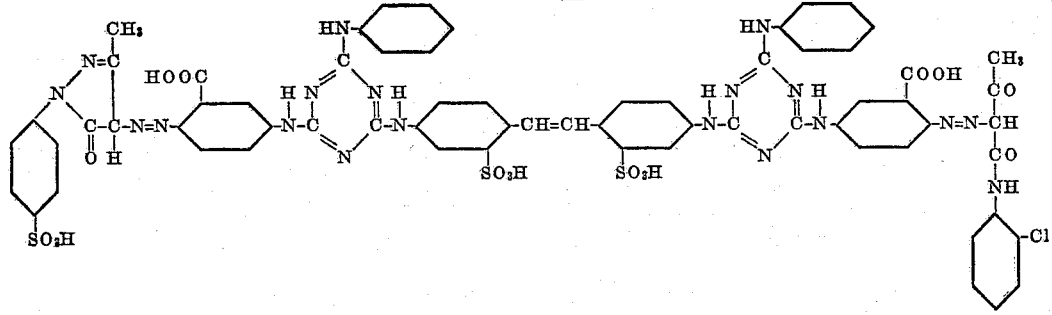
XI
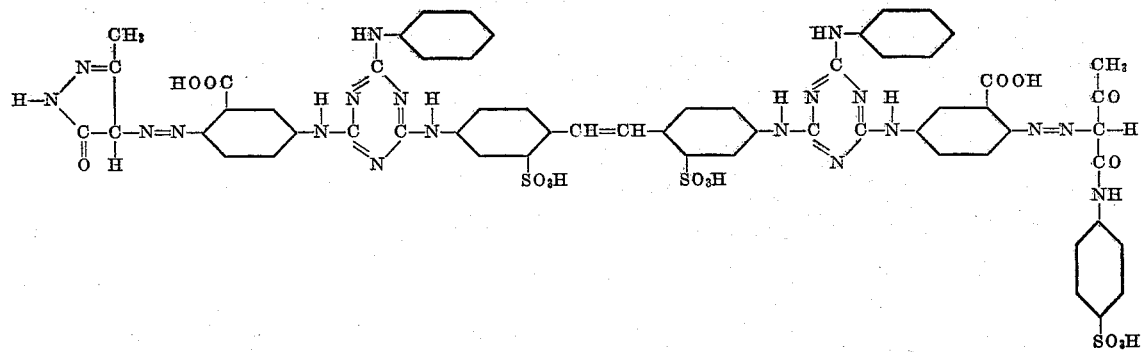
XII
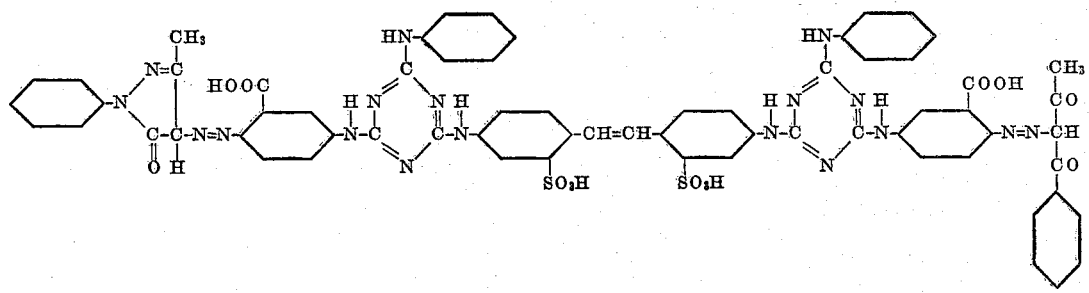
XIII
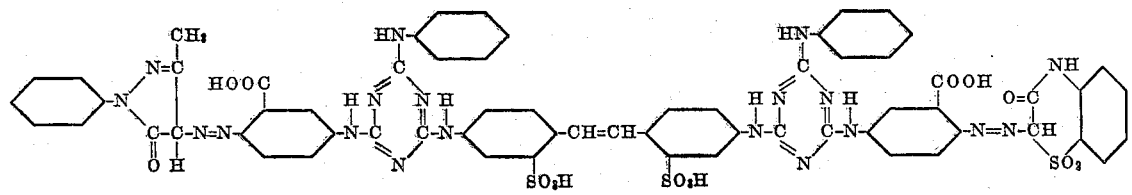
XIV From these formulas it is obvious to the expert how such dyestuffs can be prepared. For example, 4:4'-diaminostilbene-2:2'-disulfonic acid can first be reacted with 2 mols of a heterocyclic compound described in the introduction in such a manner that 1 mol each of a heterocyclic compound reacts with an amino group with formation of so-called diprimary condensation products, for example the diprimary condensation product from 2 mols of cyanuric chloride and 1 mol of diaminostilbene-disulfonic acid. The products thus obtained are reacted with 1 mol of an amino-dyestuff of the general formula

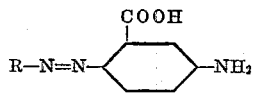

in which R has the above given significance, and then with a second mol of a yellow aminoazo-dyestuff which is capable of yielding complex metal compounds. This yellow aminoazo-dyestuff can therefore be constituted like the already mentioned aminoazo-dyestuff of the formula

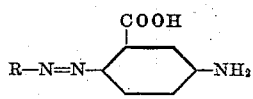

however, it may be also quite different therefrom. The capability of the yellow aminoazo-dyestuff to form complex metal compounds may be due for example to the presence of an aromatically bound hydroxyl group which stands in ortho-position to a carboxyl group. If mobile halogen atoms are still contained in the disecondary condensation products thus obtained, they are reacted preferably with compounds having mobile hydrogen atoms, such as aniline, monomethylaniline, methylamine, monoethanolamine, and the like.

However, one may also proceed in a different manner, by starting for example from 4-amino-4'-nitrostilbene-2:2'-disulfonic acid, condensing it to a so-called primary condensation product with a heterocyclic compound containing at least two mobile halogen atoms, causing the condensation product to react with one mol of an aminoazo-dyestuff of the general formula

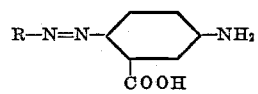

wherein R has the above given significance, reducing the remaining nitro group to an amino group and coupling the aminoazo-dyestuff thus formed of the formula

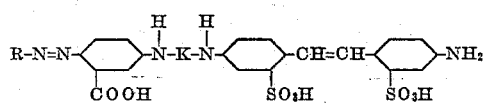

in which R and K have the above given significance, with 1 mol of a yellow aminoazo-dyestuff which is capable of forming complex metal compounds with the aid of phosgene or a heterocyclic compound containing at least two mobile halogen atoms which behaves similarly. Here, too, the yellow aminoazo-dyestuff may be a dyestuff of the just explained formula

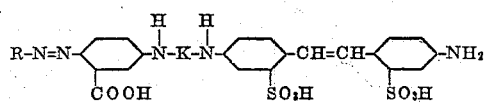

or it may correspond to the already explained formula

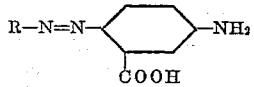

or be a derivative of salicylic acid.

The order of succession may also be reversed by linking first 4-amino-4'-nitrostilbene-disulfonic acid with the aid of phosgene or a heterocyclic compound containing mobile halogen atoms of the kind of cyanuric chloride, with the yellow aminoazo-dyestuff which is capable of forming complex metal compounds, and when the reduction is complete, effecting the condensation with the dyestuff of the formula

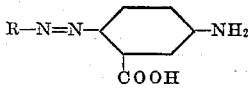

Finally, any halogen atoms which may still be present can be reacted with compounds having mobile hydrogen atoms, for instance aniline, para-aminoacetanilide, monomethylaniline, methylamine, monoethanolamine, and the like.

In the manufacture of the new dyestuffs it is of course also possible to proceed in such a manner that first of all 4-amino-4'-nitrostilbene-disulfonic acid or 4:4'-diaminostilbene-disulfonic acid is linked with the aid of phosgene or a heterocyclic compound containing at least two mobile halogen atoms with 1 or 2 mols. of a 1:4-diamino-benzene-3-carboxylic acid, di- or tetrazotizing the condensation product thus obtained, uniting it with azo-components having keto groups capable of undergoing enolisation, then reducing the nitro group which may still be present to the amino group and finally coupling the aminoazo-dyestuff thus obtained in the indicated manner with a yellow aminoazo-dyestuff which is capable of forming complex metal compounds.

The dyestuffs themselves of the general formula

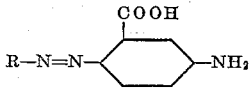

may be prepared inter alia in such a manner that an anthranilic acid nitrated in para-position to the amino group is diazotized and coupled with a compound which thanks to the presence of a keto group capable of undergoing enolisation can be united with diazo compounds to form azo compounds. Such compounds are for example acetoacetic ester derivatives such as arylides of acetoacetic acid or the pyrazolones which are obtained by condensing hydrazines with aceto-acetic ester. Such pyrazolones are for instance 3-methyl-5-pyrazolone and 1-phenyl-3-methyl-5-pyrazolone and its derivatives substituted in the benzene nucleus for example by halogen atoms and sulfo groups. Further may be used the pyrazolones from other β-ketocarboxylic acid-esters, such as for example oxalacetic ester and hydrazines, or also other products, such as malonic acid or barbituric acid derivatives, for instance the barbituric acid itself or further products such as benzoylacetone or dihydroxyquinoline.

Heterocyclic compounds corresponding to the radical K are for example products such as cyanuric chloride, cyanuric bromide, 1-phenyl-3:5-dichlorotriazine, 1-methyl-3:5-dichlorotriazine, dichloroquinazoline, tribromopyrimidine and the like, that is to say heterocyclic compounds containing mobile halogen atoms of the kind of cyanuric chloride.

As yellow aminoazo-dyestuffs containing still an atom grouping which is capable of forming complex metal compounds there may also be used, besides the already mentioned monoazo-dyestuffs of the formula

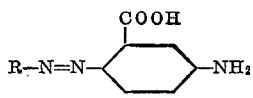

4 - amino - 4' - hydroxyazobenzene-3'- carboxylic acid, 4 - amino-2-methyl-4'-hydroxyazobenzene-3'-carboxylic acid, 4-amino-2'-methyl-4'-hydroxyazobenzene-3-carboxylic acid, 4-amino-4'-hydroxy-5'-methylazobenzene - 3' - carboxylic acid and the like or also derivatives of such azo-dyestuffs, for example the reduced condensation products of such dyestuffs with meta- or para-nitrobenzoylchloride or analogous compounds, such as

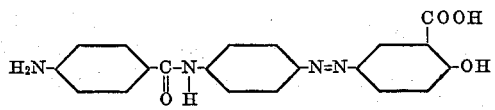

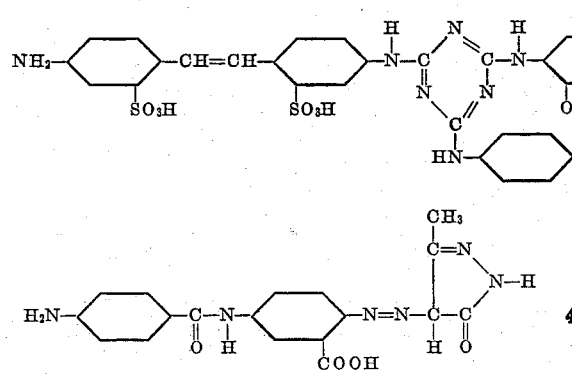

and the like.

The following examples illustrate the invention, but are not to be regarded as limiting it in any way, the parts being by weight:

*Example 1*

18.2 parts of 5-nitro-2-amino-1-benzoic acid are dissolved as ammonium salt or sodium salt, the solution is mixed with 7 parts of sodium nitrite and indirectly diazotized by pouring the mixture into 40 parts of hydrochloric acid of specific gravity 1.15 and ice. When diazotization is complete, the diazo paste is added to a solution containing 10 parts of 3-methyl-5-pyrazolone and 30 parts of sodium carbonate in 100 parts of water.

When coupling is complete the whole is heated, salted out and the dyestuff is suction-filtered.

The moist filtrate is introduced into about 100 parts of water and mixed at 60-65° C. with a filtered solution of 36 parts of crystallized sodium sulfide in about 50 parts of warm water. The mixture is further stirred for about 3 hours at 60° C., and then allowed to cool, the reduced dyestuff is precipitated with acid, filtered and purified by redissolving from dilute sodium carbonate solution. A diprimary condensation product from 1 equivalent of 4:4'-diaminostilbene-2:2'-disulfonic acid and 2 equivalents of cyanuric chloride is prepared as follows:

18.5 parts of 4:4'-diaminostilbene-2:2'-disulfonic acid are dissolved as neutral sodium salt in about 500 parts of water and cooled to 0° C. by addition of ice. To this solution is added, while stirring well, a solution of 18.4 parts of cyanuric chloride in little acetone. The whole is stirred for about 1 hour and the acid which becomes free is neutralized by the addition of sodium carbonate.

The diprimary condensation product of the formula

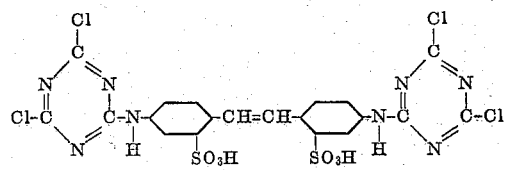

is then formed as a light yellow precipitate.

26 parts of the aminopyrazolone-azo-dyestuff of the formula

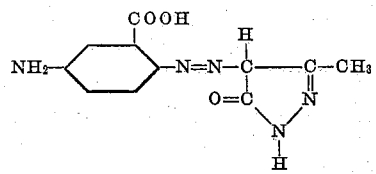

which has been obtained as described above are added to the mixture as neutral sodium salt in about 1200 parts of water. The solution is slowly heated to 40° C. and this temperature is maintained for 4 hours while slowly and constantly adding 16.8 parts of sodium bicarbonate for neutralizing the acid which becomes free. The disecondary condensation product from 1 equivalent of diaminostilbene, 2 equivalents of cyanuric chloride and 2 equivalents of the aminopyrazolone-azo-dyestuff is temporarily dissolved and partially precipitated when the condensation is complete.

When the condensation is complete, the reaction mixture is boiled for 2 hours in a reflux apparatus after addition of 30 parts of aniline for the purpose of reacting the two remaining halogen atoms of the dyestuff. The diternary condensation product which has been formed corresponds to the above Formula I. It is precipitated with common salt after addition of sodium carbonate, suction-filtered, dried and ground.

When dry, the dyestuff is an orange powder dissolving in dilute alkalies to a yellow-orange to orange solution and dyeing cotton or regenerated cellulose orange-yellow tints which when treated or after-treated in the bath with copper are rendered excellently fast to washing and light.

The same dyestuffs can be obtained when condensing first of all 1 mol of cyanuric chloride with 1 mol of the amino-pyrazolone-azo-dyestuff, then coupling 2 mols of the primary condensation product thus obtained of the formula

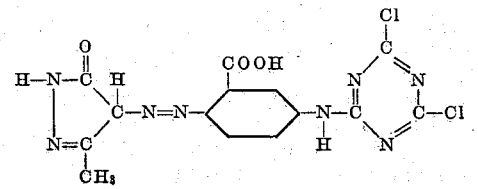

with 1 mol of diaminostilbene-disulfonic acid and finally reacting the last halogen atoms with aniline, as indicated above.

The same products can be also obtained when starting from nitroaminostilbene-disulfonic acid and suitably adapting the order of succession of the various operations to the starting material.

When replacing 3-methyl-5-pyrazolone in this example by the following pyrazolones: 5-pyrazolone-3-carboxylic acid, 1-phenyl-3-methyl-5-pyrazolone, 1-(4'-sulfo)-phenyl-3-methyl-5-pyrazolone or other 1-phenyl-3-methyl-5-pyrazolones or 1-phenyl-5-pyrazolone-3-carboxylic acid substituted in the phenyl nucleus, there are obtained analogous products which when containing still sulfo groups in the phenyl nucleus of the pyrazolone derivative, like the dyestuff from 1-(4'-sulfo)-phenyl-3-methyl-5-pyrazolone, can be used in the form of their copper compounds as direct dyestuffs. The conversion into copper compounds takes place in a manner known in itself, for example by treating the dyestuffs with a copper sulfate solution mixed with an excess of ammonia.

*Example 2*

40 parts of 4-amino-4'-nitrostilbene-2:2'-disulfonic acid are dissolved in about 200 parts of water with addition of caustic soda solution in such a manner that the solution obtained is neutral to litmus. The solution is cooled to 0° C. by addition of ice and a solution of 20 parts of cyanuric chloride in 150 parts of acetone is added while stirring. Stirring is continued for 1 hour, the acid which becomes free being neutralized with sodium carbonate solution.

A neutral solution of the reduced dyestuff obtained according to Example 1 from 26 parts of diazotized 5-nitro-2-amino-1-benzoic acid and 3-methyl-5-pyrazolone in about 200 parts of water of 50° C. is then added to the mixture. This is heated to 40° C. and maintained at this temperature for about 4 hours, the acid which becomes free being neutralized by addition of an acid binding agent such as sodium carbonate or sodium bicarbonate. For the purpose of saturating the third chlorine atom in the cyanuric chloride, the mixture is boiled for about 2 hours after addition of 30 parts of aniline, and the condensation product of the probable formula

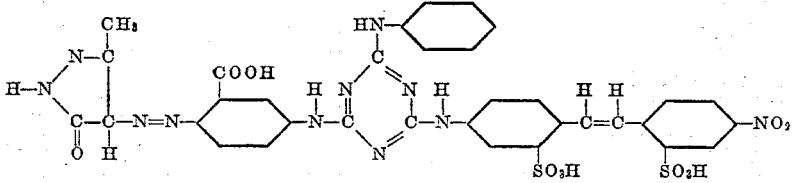

is precipitated by common salt after addition of some sodium carbonate, and suction-filtered after cooling. The dyestuff paste thus obtained is stirred in little water, mixed with a solution of 36 parts of crystallized sodium sulfide and heated for 3 hours to 60–70° C. while stirring, whereby reduction of the nitro group takes place. The mixture is carefully acidified with acetic acid, suction-filtered, and if necessary the dyestuff is redissolved from dilute sodium carbonate solution. The reduced dyestuff is dissolved in water and treated at 40–45° C. with phosgene until practically no amino group can be detected. The precipitated dyestuff corresponds to the Formula V of the introduction. When dry it is a red-brown powder which dissolves in dilute alkalies to orange to red orange solutions and dyes cotton fast red yellow tints which become faster to washing and light by after-treatment with agents yielding copper on the fiber or in the dye-bath. Analogous dyestuffs having similar properties are obtained by replacing the 3-methyl-5-pyrazolone by pyrazolones phenylated in 3- or 1-position or by pyrazolones as well as by 5- or 3-pyrazolones substituted in the phenyl radicals.

The pyrazolone dyestuffs in this or the previous examples can be replaced by such dyestuffs which are obtained by coupling diazotized nitroanthranilic acid with other components containing methylene groups capable of coupling, such as barbituric acids, acylacetic acid arylides, 1:3-diketones and the like, then reducing the nitro group and further treating the aminoazo-dyestuffs as indicated.

*Example 3*

79.9 parts of the reduced dyestuff obtained according to Example 2 of the formula

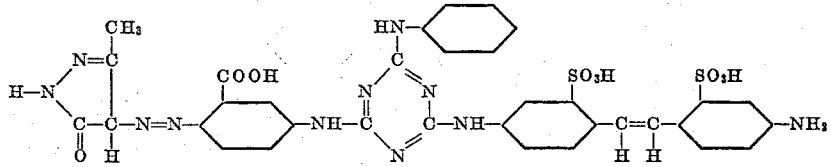

are condensed in usual manner at 0° C. with 18.4 parts of cyanuric chloride. When the condensation is complete, a warm solution of 28 parts of the sodium salt of 4-amino-4'-hydroxyazobenzene-3'-carboxylic acid is added. The temperature is raised to about 40° C., the temperature is maintained for about 4 hours, the acid which is liberated by the condensation being neutralized by addition of sodium bicarbonate. For the purpose of saturating the third chlorine atom of the cyanuric chloride the condensation product is boiled for about 2 hours in the presence of aniline. The dyestuff obtained corresponds to the Formula VI of the introduction and is salted out and isolated in the usual manner. When dry it is a yellow orange powder which dissolves in dilute alkalies to orange to red orange solutions and dyes cotton and regenerated cellulose yellow tints which become excellently fast to washing and light when after-treated with agents yielding copper in substance, on the fiber or in the dye-bath. When replacing the 3-methyl-5-pyrazolone in this example by other pyrazolones or the aminoazo-benzene-salicylic acid by other yellow aminoazo-dyestuffs which are capable of yielding complex compounds with metals, analogous products are obtained which produce valuable dyeings on cotton when treated with agents yielding metal.

Example 4

100 parts of cotton are introduced at 40-50° C. into a dye-bath containing 3000 parts of water, 1.5 parts of the dyestuff produced according to Example 1 and 2 parts of sodium carbonate. The bath is heated to 90-95° C. during ½ hour, 30 parts of crystallized sodium sulfate are added and dyeing is continued for ¾ hour at this temperature. A solution, neutralized with caustic soda solution, of 2 parts of crystallized copper sulfate and 2.5 parts of tartaric acid in 100 parts of water is then added to the dye-bath and the cotton is treated therein for ½ hour at about 95° C., after which it is rinsed as usual and dried. The cotton is dyed fast yellow tints.

As indicated in the introduction, the dyestuffs of the present invention may also be used for dyeing mixed fabrics, for example mixtures of wool and viscose artificial wool. In such cases dyeing is advantageously conducted in a neutral bath in presence of sodium or potassium chromate.

What we claim is:

1. The dyestuffs corresponding in the free form to the general formula

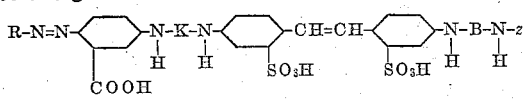

wherein R stands for the radical of a compound having a keto group capable of undergoing enolisation, K stands for a connecting link consisting of the radical of a six-membered heterocyclic compound, the heterocyclic ring of which is composed of three to four carbon atoms and three to two nitrogen atoms, not more than two nitrogen atoms being adjacent to one another, the

groups adjacent to K being attached to carbon atoms of the hetero-ring thereof, and one carbon atom of the latter bearing a substituent selected from the group consisting of a halogen atom and the radical obtained by the reaction of this halogen atom with a primary amine, B stands for a connecting link selected from the group consisting of the radical of a heterocyclic compound as explained for K and of the C=O group, and

stands for the radical of a yellow aminoazo-dyestuff, which prducts form yellow to brown powders the alkali salts of which dissolve in water to yellow solutions.

2. The dyestuffs corresponding in the free form to the general formula

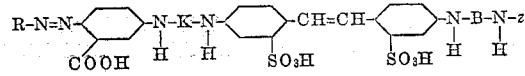

wherein R stands for the radical of a keto group capable of undergoing enolisation, K stands for a connecting link consisting of the radical of a six-membered heterocyclic system containing a heterocyclic six-membered ring consisting of carbon and nitrogen atoms, of which at least three and not more than four are carbon atoms and at least two and not more than three are nitrogen atoms, not more than two nitrogen atoms being linked with each other, said heterocyclic six-membered ring containing at least twice and not more than three times the atom grouping

to the carbon atoms of two of which the adjacent

groups of the above formula are connected, the atom grouping

not connected to the said

groups being connected to a member selected from the group consisting of halogen and the radical of a primary amine containing not more than 8 carbon atoms, B stands for a connecting link selected from the group consisting of the radical of a heterocyclic compound as explained for K and of the C=O group, and

stands for the radical of a yellow aminoazo-dyestuff, which products form yellow to brown powders the alkali salts of which dissolve in water to yellow solutions.

3. The dyestuffs corresponding in the free form to the general formula

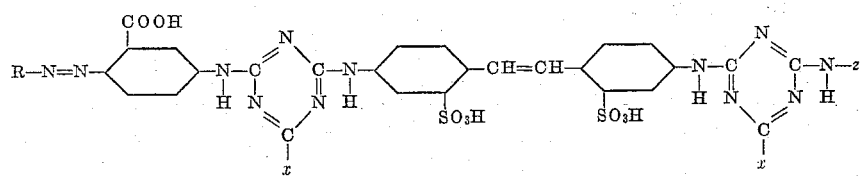

wherein R stands for the radical of a compound having a keto group capable of undergoing enolisation,

stands for the radical of a yellow aminoazo-dyestuff, and $x$ stands for a member of the group consisting of a halogen atom and the radical obtained by the reaction of this halogen atom with a primary amine, which products form yellow to brown powders the alkali salts of which dissolve in water to yellow solutions.

4. The dyestuffs corresponding in the free form to the general formula

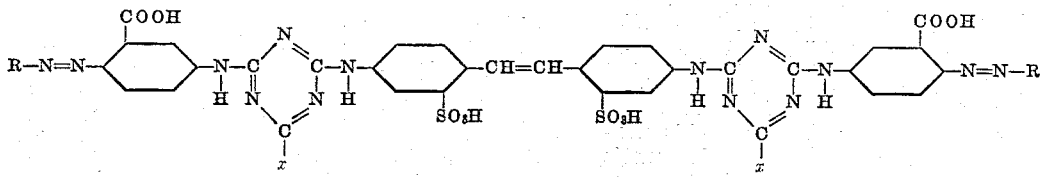

wherein A stands for the radical of a compound having a keto group capable of undergoing enolisation, wherein the adjacent azo-group is linked to a carbon atom adjacent to the CO group, and $x$ stands for a member of the group consisting of a halogen atom and the radical obtained by the reaction of this halogen atom with a primary amine containing not more than 8 carbon atoms, to the pyrazolone nucleus in 4-position, and $x$ stands for a member of the group consisting of a halogen atom and the radical obtained by the reaction of this halogen atom with primary amines containing not more than 8 carbon atoms, which products form yellow to brown powders the alkali salts of which dissolve in water to yellow solutions.

6. The dyestuff corresponding in the free form to the formula

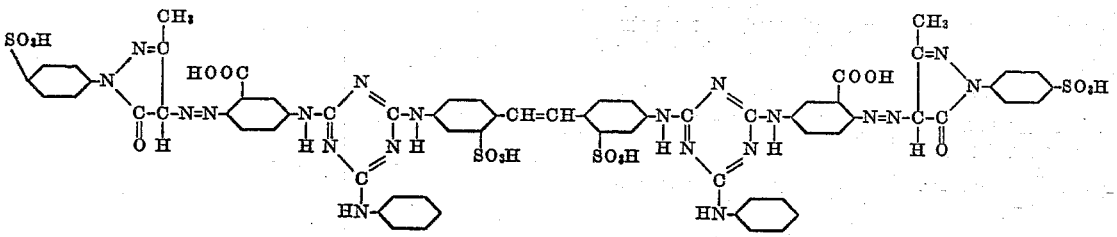

which products form yellow to brown powders the alkali salts of which dissolve in water to yellow solutions.

7. The dyestuff corresponding in the free form to the formula

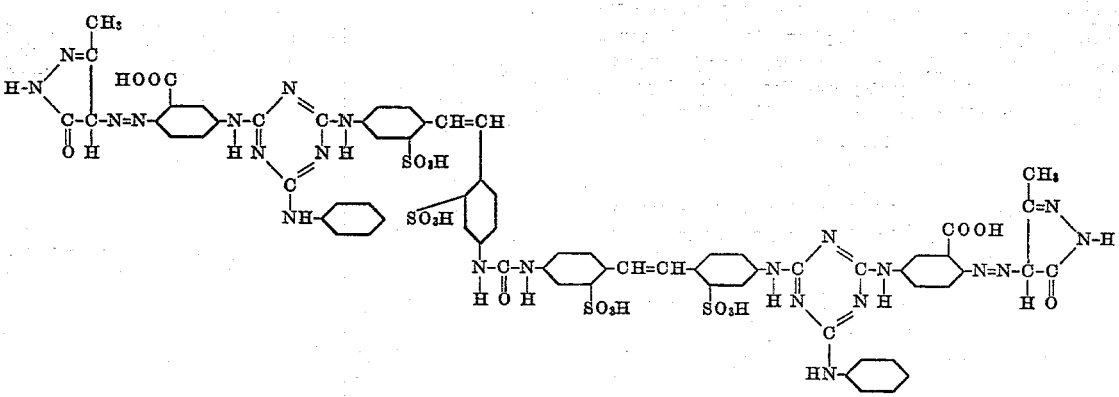

5. The dyestuffs corresponding in the free form to the general formula

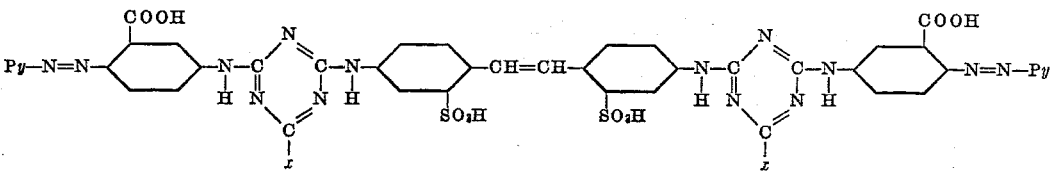

wherein Py stands for the radical of a 5-pyrazolone compound, the adjacent azo-group is linked 8. The dyestuff corresponding in the free form to the formula

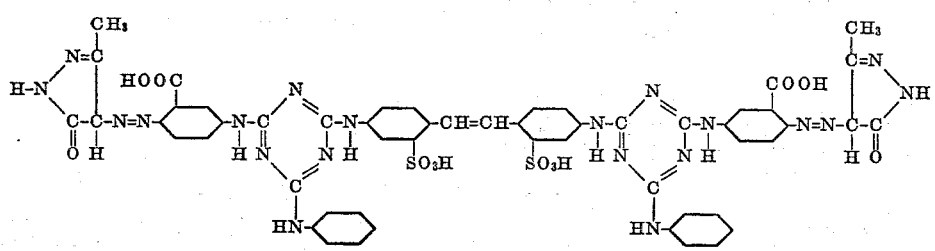

MAX SCHMID.
EDUARD MOSER.